US012590241B2

(12) United States Patent
Aljeaban et al.

(10) Patent No.: US 12,590,241 B2
(45) Date of Patent: Mar. 31, 2026

(54) MODIFIED SILICA NANOPARTICLE AND METHODS OF SYNTHESIS

(71) Applicants: SAUDI ARABIAN OIL COMPANY, Dhahran (SA); KING FAHD UNIVERSITY OF PETROLEUM & MINERALS, Dhahran (SA)

(72) Inventors: Norah Aljeaban, Dhahran (SA); Bader Alharbi, Dhahran (SA); Tawfik A. Saleh, Dhahran (SA); Tamim Alshehri, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 390 days.

(21) Appl. No.: 18/166,382

(22) Filed: Feb. 8, 2023

(65) Prior Publication Data

US 2024/0271029 A1 Aug. 15, 2024

(51) Int. Cl.

| | |
|---|---|
| ***C09K 8/54*** | (2006.01) |
| ***C09C 1/30*** | (2006.01) |
| ***C09C 3/00*** | (2006.01) |
| ***C09C 3/04*** | (2006.01) |
| ***C09C 3/08*** | (2006.01) |
| ***C09K 8/74*** | (2006.01) |
| ***E21B 41/02*** | (2006.01) |
| ***E21B 43/27*** | (2006.01) |

(52) U.S. Cl.

CPC .............. *C09K 8/54* (2013.01); *C09C 1/3027* (2013.01); *C09C 1/3063* (2013.01); *C09C 1/309* (2013.01); *C09C 3/006* (2013.01); *C09C 3/043* (2013.01); *C09C 3/08* (2013.01); *C09K 8/74* (2013.01); *E21B 41/02* (2013.01); *C01P 2004/64* (2013.01); *C09K 2208/10* (2013.01); *C09K 2208/32* (2013.01); *E21B 43/27* (2020.05)

(58) Field of Classification Search

None

See application file for complete search history.

(56) References Cited

U.S. PATENT DOCUMENTS

| | | | | |
|---|---|---|---|---|
| 10,570,331 | B2 | 2/2020 | Southwell et al. | |
| 10,801,310 | B2 | 10/2020 | Watts et al. | |
| 11,254,857 | B2 | 2/2022 | Cox et al. | |
| 2014/0090850 | A1* | 4/2014 | Benicewicz | C09K 8/70 507/224 |
| 2016/0376490 | A1* | 12/2016 | Salla | C09K 8/508 166/305.1 |
| 2018/0291253 | A1* | 10/2018 | Salla | C09K 8/5755 |

FOREIGN PATENT DOCUMENTS

| | | | |
|---|---|---|---|
| CN | 113737186 | A | 12/2021 |
| WO | 2021126303 | A1 | 6/2021 |

OTHER PUBLICATIONS

Olivieri, Federico et al. "Mesoporous silica nanoparticles as carriers of active agents for smart anticorrosive organic coatings: a critical review." Nanoscale vol. 13,20 (2021): 9091-9111. doi:10.1039/d1nr01899j.

Ismail Ab Rahman, Vejayakumaran Padavettan, "Synthesis of Silica Nanoparticles by Sol-Gel: Size-Dependent Properties, Surface Modification, and Applications in Silica-Polymer Nanocomposites—A Review", Journal of Nanomaterials, vol. 2012, Article ID 132424, 15 p. 2012. https://doi.org/10.1155/2012/132424.

Jeffrey O. Oseh, M. N. A. M Norddin, Issham Ismail, Augustine Agi, Afeez O. Gbadamosi, Abdul R. Ismail, Prasad Manoger, Kumaresan Ravichandran, Synergistic application of polypropylene and silica nanoparticle modified by (3-Aminopropyl) triethoxysilane for cuttings transport, Journal of King Saud University—Engineering Sciences, vol. 34, Issue 4, 2022, pp. 290-301, ISSN 1018-3639,https://doi.org/10.1016/j.jksues.2020.10.007.

Mercado, D.Fabio & Ballesteros, L. & Lizarazo-Gomez, Cindy & Nunez-Rodriguez, Brucxen & Arenas, Edward & Baldovino, Victor. (2022). Synthesis and use of functionalized SiO2 nanoparticles for formulating heavy oil macroemulsions. Chemical Engineering Science. 252. 117531. 10.1016/j.ces.2022.117531.

SWPU, Petroleum. (2017). Emergence of nanotechnology in the oil and gas industry: Emphasis on the application of silica nanoparticles. Petroleum. 3. 391-405.

Eugene Ngwana, Ngouangna & Manan, Mohammad & Oseh, Jeffrey & Norddin, M.N.A.M. & Augustine, Agi & Gbadamosi, Afeez. (2020). Influence of (3-Aminopropyl) triethoxysilane on silica nanoparticle for enhanced oil recovery. Journal of Molecular Liquids. 315. 113740. 10.1016/j.molliq.2020.113740.

Dargahi-Zaboli, Maliheh & Sahraei, Eghbal & Pourabbas, Behzad. (2016). Hydrophobic silica nanoparticle-stabilized invert emulsion as drilling fluid for deep drilling. Petroleum Science. 14. 1-11. 10.1007/s12182-016-0135-0.

B. Ramezanzadeh, E. Raeisi, M. Mahdavian, Studying various mixtures of 3-aminopropyltriethoxysilane (APS) and tetraethylorthosilicate (TEOS) silanes on the corrosion resistance of mild steel and adhesion properties of epoxy coating, International Journal of Adhesion and Adhesives, vol. 63, 2015, pp. 166-176, ISSN 0143-7496, https://doi.org/10.1016/j.ijadhadh.2015.09.007.

A. Espinoza-Vázquez, F.J. Rodríguez-Gómez, I.K. Martínez-Cruz, D. Ángeles-Beltrán, G.E. Negrón-Silva, M. Palomar-Pardavé, L.L. Romero, D. Pérez-Martínez, A.M. Navarrete-López, Adsorption and corrosion inhibition behaviour of new theophylline-triazole-based derivatives for steel in acidic medium, R. Soc. Open Sci. 6 (2019).

(Continued)

*Primary Examiner* — John J Figueroa

(74) *Attorney, Agent, or Firm* — Vorys, Sater, Seymour and Pease LLP

(57) ABSTRACT

Silica nanoparticles grafted with hydrophobic branches and amines may be used to mitigate corrosion. For example, method for mitigating corrosion downhole may include introducing a treatment fluid into a subterranean formation, wherein the treatment fluid includes: an aqueous acid and a plurality of silica nanoparticles grafted with hydrophobic branches and amines. Examples of amines may include C2 to C18 amines. Examples of hydrophobic branches may include C2 to C18 alkyl groups.

10 Claims, No Drawings

(56) References Cited

OTHER PUBLICATIONS

N.D. Nam, A. Somers, M. Mathesh, M. Seter, B. Hinton, M. Forsyth, M.Y.J. Tan, The behaviour of praseodymium 4-hydroxycinnamate as an inhibitor for carbon dioxide corrosion and oxygen corrosion of steel in NaCl solutions, Corros. Sci. 80 (2014) 128-138.

X. Jiang, Y.G. Zheng, W. Ke, Effect of flow velocity and entrained sand on inhibition performances of two inhibitors for CO2 corrosion of N80 steel in 3% NaCl solution, Corros. Sci. 47 (2005) 2636-2658.

* cited by examiner

MODIFIED SILICA NANOPARTICLE AND METHODS OF SYNTHESIS

FIELD OF THE DISCLOSURE

The present disclosure relates generally to corrosion prevention and, more particularly, to mitigation of corrosion in hydrocarbon wells.

BACKGROUND OF THE DISCLOSURE

Reservoir stimulation may be performed on a subterranean formation (comprising a reservoir therein) to achieve, increase, or restore fluid production therefrom, such as hydrocarbons including oil and gas. Reservoir stimulation operations may include, as a nonlimiting example, matrix acidizing, fracturing, and acid fracturing. The type of stimulation operation employed in a particular circumstance may depend on factors including the geology of the formation and the type of hydrocarbons being produced.

Acidizing of a reservoir may involve the injection of a treatment fluid into a downhole subterranean formation through a wellbore. The treatment fluid may comprise hot concentrated acid. Reservoir stimulation operations may employ equipment at the surface, in the wellbore, at a downhole location, or any combination thereof to convey the treatment fluid to the subterranean formation. The equipment used may be, at least partially, manufactured of steel, preferably carbon steel. Steel, including carbon steel, may be susceptible to corrosion due to contact with acid, aqueous fluid, or the like, thus increasing the importance of corrosion mitigation in reservoir stimulation operations.

Corrosion may reduce operational capability and may require costly remediation or replacement of components of equipment. Current methods of mitigating corrosion of reservoir stimulation equipment may involve coatings and additives to treatment fluids, which may be ineffective and may be costly to manufacture and apply.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A nonlimiting corrosion inhibition method of the present disclosure includes: introducing a treatment fluid into a subterranean formation, wherein the treatment fluid comprises: a plurality of silica nanoparticles grafted with hydrophobic branches and amines, and an aqueous acid.

A nonlimiting composition of the present disclosure includes: a plurality of silica nanoparticles grafted with hydrophobic branches and amines.

Another nonlimiting method of the present disclosure includes: mixing 3-(aminopropyl)trimethoxysilane and n-octyltriethoxysilane to silica nanoparticles to form a mixture; and producing silica nanoparticles grafted with hydrophobic branches and amines from the mixture.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Embodiments in accordance with the present disclosure generally relate to corrosion prevention and, more particularly, to mitigation of corrosion in hydrocarbon wells.

Compositions of the present disclosure include silica nanoparticles that may provide greater corrosion mitigation than those conventionally used in subterranean stimulation operations. The silica nanoparticles of the present disclosure may interact with downhole equipment in such a manner that provides corrosion mitigation to the surface affected, as discussed below.

"Corrosion" as used herein refers to deterioration of a material as a result of contact with a degradative species in its surroundings. In the case of the present disclosure, corrosion may include, but is not limited to, water wetting, scale formation (e.g., iron sulfide scale formation), solid accumulation, acid corrosion, or any other corrosion method or type known in the art, as well as any combination thereof.

Silica Nanoparticle Compositions and Methods of Making

Compositions of the present disclosure may comprise a plurality of silica nanoparticles grafted with hydrophobic branches and amines. Silica nanoparticles may provide corrosion mitigation to steel and other surfaces. Silica nanoparticles may be cost effective due to relative low cost of silica, and are additionally generally considered non-toxic and thus are more environmentally sustainable compared to conventional corrosion mitigation compositions. Additionally, nanoparticle silica maintains high thermal stability, allowing its use in conditions with high pressure, high temperature, or a combination thereof.

The silica nanoparticles grafted with hydrophobic branches and amines may comprise a silica-based core, one or more hydrophobic branches, and one or more amines. The one or more hydrophobic branches may comprise C2 to C18 alkyl groups (preferably C4 to C10 alkyl groups, more preferably C6 to C8 alkyl groups, and most preferably C8 alkyl groups). The C2 to C18 alkyl groups may be branched, linear, or any combination thereof. Each silica-based core may have, grafted to the core, 1 to 8 hydrophobic branches, or preferably 1 to 4 hydrophobic branches, or most preferably 4 hydrophobic branches. The one or more amines may comprise C2 to C18 amine groups (preferably C2 to C6 amine groups, more preferably C3 to C5 amine groups, and most preferably C3 amine groups). The C3 amine groups may preferably comprise 3-aminopropyl groups. The C2 to C18 amine groups may be branched, linear, or any combination thereof. The C2 to C18 amine groups may comprise a monoamine or a diamine. Each silica-based core may have, grafted to the core, 1 to 8 amine groups, or preferably 1 to 4 amine groups, or most preferably 4 amine groups.

It should be noted that each silica-based core may have any combination of amines and alkyl groups grafted to the core in accordance with the present disclosure. As a nonlimiting example, a silica-based stabilizing group may have grafted, to the core, two linear C8 alkyl groups, two branched C10 alkyl groups, one linear C4 diamine group, and three branched C12 diamine groups.

As a nonlimiting example the silica nanoparticles grafted with hydrophobic branches and amines may preferably comprise 3-aminopropyl and C8 alkyl groups grafted to silicon oxide (APTMS-TS@$SiO_2$). APTMS-TS@$SiO_2$ may have a structure comprising the following structure (Structure I).

Structure I

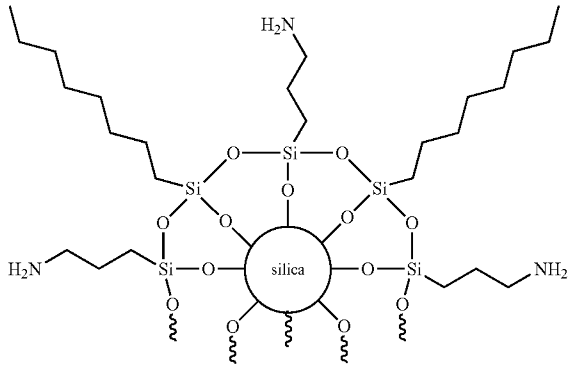

The present disclosure includes methods of synthesis of compositions comprising silica nanoparticles. The silica nanoparticle compositions of the present disclosure may be synthesized using any suitable method including preferably a thermal treatment sol-gel process.

The nonlimiting thermal treatment sol-gel synthesis method may include dilution of tetraethyl orthosilicate (TEOS) in ethanol, wherein the TEOS has a concentration of 10 vol % (volume percent) to 30 vol % (or 15 vol % to 25 vol %, or 10 vol % to 25 vol %, or 15 vol % to 30 vol %, or about 20 vol %), by volume of the ethanol. The mixture of TEOS and ethanol may be homogenized using any suitable method for 1 hour (hr) to 4 hr (or 1 hr to 3 hr, or 2 hr to 4 hr, or about 2 hr) at a temperature from 5° C. to 15° C. (or 5° C. to 10° C., or 10° C. to 15° C., or 7.5° C. to 12.5° C., or about 10° C.). The mixture of TEOS and ethanol may furthermore be hydrolyzed through addition of water and addition of ammonium hydroxide ($NH_4OH$) at a concentration from 0.5 M (mol/L) to 1.5 M (or 0.8 M to 1.2 M, or 0.9 M to 1.1 M, or about 1 M). The hydrolyzing of the TEOS may occur at room temperature (about 22° C.) for a time duration of 3 hr to 7 hr (or 4 hr to 6 hr, or 4 hr to 5 hr, or 5 hr to 6 hr, or about 5 hr). The hydrolyzing of TEOS may result in the formation of a composition comprising a colloidal system of silica nanoparticles. An nonlimiting example for synthesis of the colloidal system of silica nanoparticles is shown the following reaction scheme (Scheme I).

Scheme I

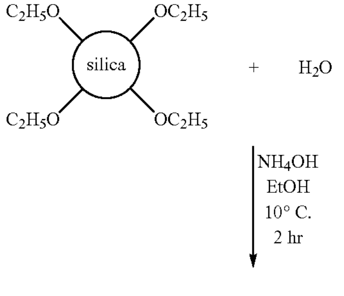

-continued

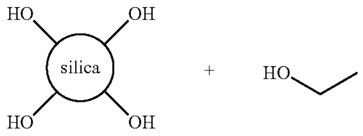

The colloidal system of silica nanoparticles may furthermore have added alkoxysilane groups comprising hydrophobic branches and amines to be grafted to the silica nanoparticles. The alkoxysilane groups comprising the hydrophobic branches may be added at a concentration of 5 vol % to 15 vol % (or 8 vol % to 12 vol %, or 8 vol % to 10 vol %, or 10 vol % to 12 vol %, or about 10 vol %), by volume of the colloidal system of silica nanoparticles. The alkoxysilane groups comprising the amines may be added at a concentration of 1 vol % to 15 vol % (or 3 vol % to 9 vol %, or about 5 vol %), by volume of the colloidal system of silica nanoparticles. The alkoxysilane groups comprising the hydrophobic groups may comprise C2 to C18 alkyl groups as discussed above and may preferably comprise n-octyltriethoxysilane, and the alkoxysilane groups comprising the amines may comprise C2 to C18 amine groups as discussed above and may preferably comprise 3-(aminopropyl) trimethoxysilane. The alkoxysilane groups and the colloidal system of silica nanoparticles may be homogenized using any suitable method including, but not limited to, an ultrasonic device. The homogenizing may occur for from 1 hr to 4 hr (or 1 hr to 3 hr, or 2 hr to 4 hr, or about 2 hr) and at a temperature from 50° C. to 70° C. (or 55° C. to 65° C., or 50° C. to 60° C., or 60° C. to 70° C., or about 60° C.). The homogenized composition may subsequently be refluxed at a temperature of 60° C. to 80° C. (or 65° C. to 75° C., or 60° C. to 70° C., or 70° C. to 80° C., or about 70° C.) for from 5 hr to 7 hr (or 5 hr to 6 hr, or 6 hr to 7 hr, or about 6 hr). The refluxed composition may furthermore be dried to obtain a powder comprising the silica nanoparticles grafted with hydrophobic branches and amines. The following is a nonlimiting example scheme for grafting of the silica nanoparticles to the alkoxysilane groups, specifically (3-aminopropyl)trimethoxysilane (APTMS) and n-octyltriethoxysilane.

Scheme II

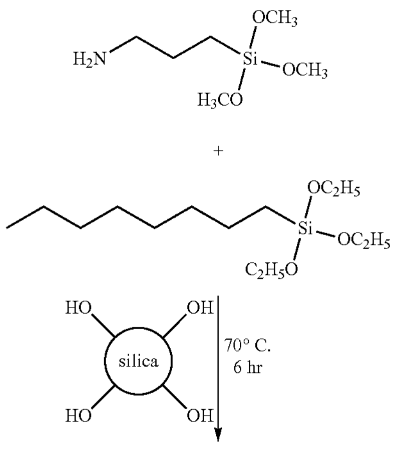

-continued

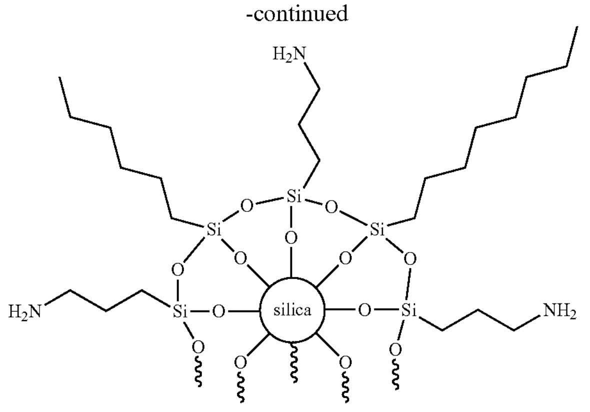

Treatment Fluids and Related Methods

Compositions of the present disclosure may be formed to a treatment fluid for use in a subterranean formation. Treatment fluids of the present disclosure may comprise a plurality of the, previously described, silica nanoparticles grafted with hydrophobic branches and amines, and may comprise an aqueous acid.

The term "treatment fluid," and grammatical variants thereof, refers to any fluid that may be used in a subterranean treatment operation (also referred to simply as "treatment" or "operation" herein) in conjunction with a desired function. The term "treatment fluid" does not imply any particular action by the fluid or any component thereof.

The aqueous acid of the present disclosure may comprise any suitable aqueous acid for use in treatment fluids for stimulation of subterranean formations for hydrocarbon production. The aqueous acid may include an aqueous fluid. Example aqueous fluids may include, but are not limited to, fresh water (e.g., stream water, lake water, or municipal treated water), non-potable water such as gray water or industrial process water, sea water, brine, aqueous salt solutions, partially desalinated water, produced water (including brine and other salt water solutions), the like, or any combination thereof. The aqueous acid may include any suitable acid. Example acids may include, but are not limited to, mineral acids, hydrochloric acid, hydrobromic acid, formic acid, acetic acid, propionic acid, methanesulfonic acid, chloroacetic acid (e.g., mono-chloroacetic acid, dichloroacetic acid, and trichloroacetic acid), trifluoroacetic acid, the like, or any combination thereof. Any acid may be suitable for use in the disclosure herein may be able to generate a pH of two (2) or lower when present in the treatment fluid in a suitable amount. Suitable aqueous acid solutions may have an acid concentration ranging from 5 wt % to 50 wt %, or 10 wt % to 40 wt %, or 10 wt % to 30 wt %, based on total mass of the aqueous acid.

The silica nanoparticles grafted with hydrophobic branches and amines may be present in the treatment fluid at any suitable concentration including from 1 part per million (ppm) to 1000 ppm (or 1 ppm to 500 ppm, or 100 ppm to 500 ppm, or 200 ppm to 400 ppm, or 200 ppm to 500 ppm, or 200 ppm to 1000 ppm, or 300 ppm to 1000 ppm, or 1 ppm to 300 ppm, or about 300 ppm), based on total mass of the treatment fluid.

The treatment fluids described herein may further include one or more additional components suitable for achieving one or more desired functions (e.g., in addition to the stimulation operation in question). Examples of suitable additional components may include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, an iron control agent, the like, or any combination thereof. Suitable examples of the foregoing will be familiar to one having ordinary skill in the art.

Suitable stimulation operations that may be performed with the treatment fluids may include, for example, fracturing, acid fracturing, matrix acidizing, or any combination thereof. The treatment fluids may also be used in conjunction with scale dissolution operations as well. The treatment fluids of the present disclosure may allow for provision of one or more of the aforementioned functions simultaneously, allowing for a single-stage reservoir stimulation operation to be carried out where, conventionally, multiple stages of reservoir stimulation may have been required. No special mixing or equipment requirements are believed to be needed for preparation and use of the treatment fluids described herein.

In some embodiments, the treatment fluids disclosed herein (including mixing of individual components or mixtures thereof) may be mixed at a remote location from a job site and shipped thereto or, in other embodiments, the treatment fluids may mixed at a job site. In still other embodiments, the treatment fluid may be mixed and pumped into a subterranean formation on-the-fly. A person having ordinary skill in the art of designing such fluids with the benefit of this disclosure will be able to consider these factors and determine whether remote mixing, on-site mixing, or any other suitable mixing protocol is most appropriate for a given operation. The systems used for handling treatment fluids for use in stimulation operations of the present disclosure may include one or more mixing and/or storage tanks used for mixing and/or storing, respectively, treatment fluids prior to use in a stimulation operation. Additional tanks may be used for storing spent or partially spent treatment fluid removed from a subterranean formation as part of a stimulation operation. Following a stimulation operation, the treatment fluids or a spent or partially spent variant thereof may be produced from the subterranean formation during aqueous fluid flowback.

Systems for introduction of treatment fluids to a wellbore in conjunction with a stimulation operation may comprise a pump fluidly coupled to a tubing, the tubing located at least partially within the wellbore and the tubing containing a treatment fluid for a desired stimulation operation. The "pump" described herein may comprise a single pump or may comprise one or more pumps which may include "high pressure" and "low pressure" pump(s) in any combination. A "high pressure" pump, i.e., a pump operating at a pressure greater than about 1000 psi, may be used in stimulation operations according to the present disclosure such as acid fracturing where fracturing of the subterranean formation at a pressure higher than the fracture gradient pressure is required. A "low pressure" pump, i.e., a pump operating at a pressure of about 1000 psi or less, may be used in stimulation operations such as matrix acidizing where lower pressures are needed and where fracturing of the subterranean formation is not required. Given the benefit of the present disclosure, one having ordinary skill in the art will be able to select an appropriate pump or combination of pumps for a given stimulation operation.

The treatment fluids of the present disclosure may be injected using the pump(s) into the subterranean formation using the wellbore tubing located within the wellbore. The wellbore tubing may preferably comprise steel piping, and more preferably carbon steel piping. The treatment fluid used in a particular stimulation operation may flow downhole through the wellbore tubing and flow out of the tubing into the subterranean formation in order to carry out the stimulation operation. Subsequently, in some stimulation operations including matrix acidizing and acid fracturing, the treatment fluid of a particular stimulation operation may be flowed back to the wellhead along with residual components which may include, for example, the acid-soluble material dissolved from the formation matrix during an acidizing operation. The treatment fluid and residual components may flow through the wellbore tubing or the wellbore annulus and back to the wellhead.

It should be noted that additional nonlimiting components may be present in systems suitable to introduce the treatment fluids to a subterranean formation and to recover fluid from the subterranean formation following stimulation. Such additional components will be familiar to one having ordinary skill in the art and include, but are not limited to, supply hoppers, valves, condensers, adapters, joints, gauges, sensors, compressors, pressure controllers, pressure sensors, flow rate controllers, flow rate sensors, temperature sensors, the like, or any combination thereof.

It is also to be recognized that the disclosed treatment fluids comprising the silica nanoparticles of the present disclosure may affect various equipment that may come into contact with the treatment fluids during operation, including in a manner such that the silica nanoparticles provide corrosion mitigation to surfaces of the equipment. Without being bound by theory, the silica nanoparticles and any associate components of the treatment fluid may provide corrosion mitigation to surfaces of equipment through any suitable method including, attachment, coating, chemical bonding (e.g., covalent bonding, ionic bonding, the like or any combination thereof), chemical reaction with surfaces, the like, or any combination thereof. Continuing to not be bound by theory, the silica nanoparticles may adsorb to surfaces of equipment forming a layer that provides corrosion mitigation.

The equipment discussed in the present disclosure may comprise surface equipment that may include, but is not limited to, supply hoppers, valves, condensers, adapters, joints, gauges, sensors, compressors, pressure controllers, pressure sensors, flow rate controllers, flow rate sensors, temperature sensors, the like, or any combination thereof. The equipment discussed herein may furthermore comprise downhole equipment that may include, but is not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices, or components, the like, or any combination thereof.

It should further be noted that treatment fluids of the present disclosure may be used, in any amount, for any operation on a subterranean formation including, but not limited to, a drilling fluid, a stimulation fluid, a fracturing fluid, a spotting fluid, a clean-up fluid, a completion fluid, a remedial treatment fluid, an abandonment fluid, a pill, an acidizing fluid, a cementing fluid, a packer fluid, an imaging fluid, the like, or any combination thereof. Furthermore, it should be noted that although the compositions of the present disclosure are described as providing corrosion protection to equipment used in a reservoir stimulation operations, it is envisioned by the present disclosure that compositions described herein may be used to prevent corrosion in any suitable application, including, for example, a pipeline, a storage tank, a processing unit, the like, or any combination thereof.

Experiment 1

Experiment 1 was carried out in accordance with ASTM G1-03(2017). Pre-weighed carbon steel specimens were immersed entirely in 100 ml of test solutions housed in a 250 ml glass container held at 90° C. for 4 hours. After 4 hours each specimen was removed, rinsed with distilled water and acetone, and dried. Specimens were subsequently weighed. The difference in weight before and after the specimens were immersed was used to calculate the weight loss. The difference was then used to calculate the average weight loss between replicates and to compute the corrosion inhibition efficiency. The % inhibition efficiency (% IE) was calculated using Equation 1.

$$\% IE = \frac{CR_0 - CR_I}{CR_0} \times 100 \quad \text{Equation 1}$$

where $CR_0$ and $CR_1$ are the weight of the samples before and after immersion in test solution, respectively.

Test solutions included combinations of 5% hydrochloric acid (HCl), optionally with added 5% methanesulfonic acid (MSA). Test solutions both with and without the addition of silica nanoparticles with hydrophobic branches and amines as corrosion inhibitor were tested. The silica nanoparticles with hydrophobic branches and amines used in testing comprise APTMS-TS@$SiO_2$. Results of testing are shown in Table 1 below.

TABLE 1

Results of testing of specimens in test solutions.

| Sample | Concentration APTMS-TS@SiO2 | Acid System | Weight Before (g) | Weight After (g) | Net Weight Loss (g) | % IE |
|---|---|---|---|---|---|---|
| A | None | 5% HCl | 12.0376 | 10.189 | 1.8486 | n/a |
| B | 300 ppm | 5% HCl | 12.0107 | 11.773 | 0.2377 | 98.02 |
| C | None | 5% HCl + 5% MSA | 12.0119 | 9.991 | 2.0209 | n/a |
| D | 300 ppm | 5% HCl + 5% MSA | 11.9753 | 11.600 | 0.3753 | 96.866 |

As shown in the table above, the net weight loss for solutions with corrosion inhibitor (samples B and D) was significantly lower than that of solutions without (samples A and C). Additionally, there was a significant inhibition efficiency of 98.02% and 96.86% for samples B and D, respectively, indicating corrosion protection offered by the addition of silica nanoparticles.

Additional Embodiments

Embodiments disclosed herein include:

Embodiment 1. A corrosion inhibition method, the method comprising: introducing a treatment fluid into a subterranean formation, wherein the treatment fluid comprises: a plurality of silica nanoparticles grafted with hydrophobic branches and amines, and an aqueous acid.

Embodiment 2. The method of Embodiment 1, wherein the amines comprise C2 to C18 amine groups.

Embodiment 3. The method of Embodiment 2, wherein the C2 to C18 amine groups comprise 3-aminopropyl groups.

Embodiment 4. The method of Embodiment 1, wherein the hydrophobic branches comprise C2 to C18 alkyl groups.

Embodiment 5. The method of Embodiment 4, wherein the C2 to C18 alkyl groups comprise C8 alkyl groups.

Embodiment 6. The method of any one of Embodiments 1-5, wherein the plurality of silica nanoparticles grafted with hydrophobic branches and amines comprises more than one silica nanoparticle having a structure of Structure I.

Embodiment 7. The method of any one of Embodiments 1-6, wherein the plurality of silica nanoparticles grafted with hydrophobic branches and amines has a concentration in the treatment fluid from 100 ppm to 500 ppm, by weight of the treatment fluid.

Embodiment 8. The method of any one of Embodiments 1-7, wherein the aqueous acid is selected from the group consisting of a mineral acid, an organic acid, and any combination thereof.

Embodiment 9. The method of any one of Embodiments 1-8, wherein the aqueous acid comprises hydrochloric acid, methanesulfonic acid, or any combination thereof.

Embodiment 10. The method of any one of Embodiments 1-9, further comprising contacting the treatment fluid with a surface of an equipment, wherein the equipment comprises surface equipment, downhole equipment, or any combination thereof.

Embodiment 11. The method of Embodiment 10, further comprising inhibiting, at least partially, corrosion of the surface of the equipment.

Embodiment 12. A composition comprising: a plurality of silica nanoparticles grafted with hydrophobic branches and amines.

Embodiment 13. The composition of Embodiment 12, wherein the amines comprise C2 to C18 amine groups.

Embodiment 14. The composition of Embodiment 13, wherein the C2 to C18 amine groups comprise 3-aminopropyl groups.

Embodiment 15. The composition of Embodiment 12, wherein the hydrophobic branches comprise C2 to C18 alkyl groups.

Embodiment 16. The composition of Embodiment 15, wherein the C2 to C18 alkyl groups comprise C8 alkyl groups.

Embodiment 17. The composition of any one of Embodiments 12-16, wherein the plurality of silica nanoparticles grafted with hydrophobic branches and amines comprises more than one silica nanoparticle having a structure of Structure I.

Embodiment 18. The composition of any one of Embodiments 12-17, formed to a powder.

Embodiment 19. The composition of any one of Embodiments 12-18, formed to a treatment fluid.

Embodiment 20. The composition of Embodiment 19, wherein the treatment fluid comprises an aqueous acid.

Embodiment 21. The composition of Embodiment 20, wherein the aqueous acid comprises hydrochloric acid, methanesulfonic acid, or any combination thereof.

Embodiment 22. A method comprising: mixing 3-(aminopropyl)trimethoxysilane and n-octyltriethoxysilane to silica nanoparticles to form a mixture; and producing silica nanoparticles grafted with hydrophobic branches and amines from the mixture.

Embodiment 23. The method of Embodiment 22, further comprising: homogenizing, using an ultrasonic device, the mixture; refluxing the mixture; and drying the mixture to a powder comprising the silica nanoparticles grafted with hydrophobic branches and amines.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A corrosion inhibition method, the method comprising:
introducing a treatment fluid into a subterranean formation, wherein the treatment fluid comprises:
a plurality of silica nanoparticles grafted with hydrophobic branches and amines; and
an aqueous acid;
wherein the treatment fluid is injected into the subterranean formation via wellbore tubing located within a wellbore of the subterranean formation, wherein the wellbore tubing comprises steel piping and the plurality of silica nanoparticles inhibits corrosion of the steel piping.

2. The method of claim 1, wherein the amines comprise C2 to C18 amine groups.

3. The method of claim 2, wherein the C2 to C18 amine groups comprise 3-aminopropyl groups.

4. The method of claim 1, wherein the hydrophobic branches comprise C2 to C18 alkyl groups.

5. The method of claim 4, wherein the C2 to C18 alkyl groups comprise C8 alkyl groups.

6. The method of claim 1, wherein the plurality of silica nanoparticles grafted with hydrophobic branches and amines comprises more than one silica nanoparticle having a structure of:

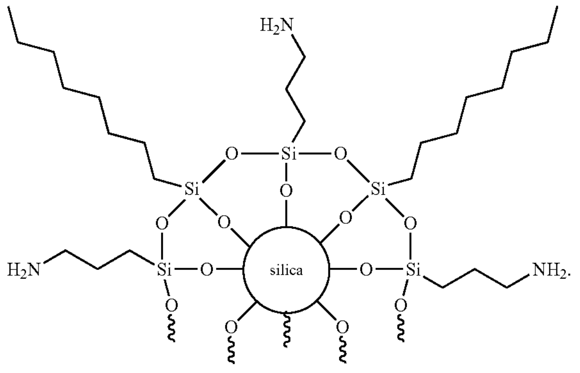

7. The method of claim 1, wherein the plurality of silica nanoparticles grafted with hydrophobic branches and amines has a concentration in the treatment fluid from 100 ppm to 500 ppm, by weight of the treatment fluid.

8. The method of claim 1, wherein the aqueous acid comprises hydrochloric acid, methanesulfonic acid, or any combination thereof.

9. The method of claim 1, further comprising contacting the treatment fluid with a surface of an equipment, wherein the equipment comprises surface equipment, downhole equipment, or any combination thereof.

10. The method of claim 9, further comprising inhibiting, at least partially, corrosion of the surface of the equipment.

* * * * *